United States Patent [19]

Ohlstedt

[11] Patent Number: 5,568,543
[45] Date of Patent: Oct. 22, 1996

[54] STORED PROGRAM CONTROLLED DIGITAL PUBLIC EXCHANGE

[75] Inventor: Mats C. S. Ohlstedt, Bromma, Sweden

[73] Assignee: Telefonaktiebolaget LM Ericsson, Stockholm, Sweden

[21] Appl. No.: 519,591

[22] Filed: Aug. 29, 1995

Related U.S. Application Data

[63] Continuation of Ser. No. 90,176, Jul. 19, 1993, abandoned.

[51] Int. Cl.$^6$ .................................................. H04M 3/00
[52] U.S. Cl. ...................... 379/268; 379/269; 379/242; 379/196
[58] Field of Search .................................. 379/269, 230, 379/189, 220, 242, 258, 333, 334, 335, 94, 279, 207, 219, 268, 11, 196

[56] References Cited

U.S. PATENT DOCUMENTS

| | | | |
|---|---|---|---|
| 3,886,315 | 5/1975 | Lee et al. | 379/278 |
| 4,201,889 | 5/1980 | Lawrence et al. | 379/269 |
| 4,317,962 | 3/1982 | Cox et al. | 379/269 |
| 4,336,422 | 6/1982 | Mellon | 379/189 |
| 4,419,753 | 12/1983 | Kojima et al. | 370/62 |
| 4,694,452 | 9/1987 | Beckinger et al. | 379/230 |
| 4,791,662 | 12/1988 | Ahnen et al. | 379/269 |
| 4,928,304 | 5/1990 | Sakai | 379/94 |

*Primary Examiner*—Krista M. Zele
*Assistant Examiner*—Scott Wolinsky
*Attorney, Agent, or Firm*—Burns, Doane, Swecker & Mathis, L.L.P.

[57] ABSTRACT

A stored-program-controlled local telephone exchange in which internal connections and conference connections are treated as though they were both a combination of an external connection, namely an originating connection and a terminating connection. This is achieved by providing a virtual route, which is realized by records in a computer memory and which is linked to a call handler and which, from the aspect of the call handler, behaves as a conventional trunk terminal. Alternatively, the virtual route can be replaced with two hardware implemented digital trunk terminals which are mutually connected by a physical wire connection. In the case of a conference connection, the conference equipment is connected to a hardware implemented digital trunk terminal which coacts with the virtual route. From the aspect of the call handlers, there is formed a barrier over which signalling takes place in an identical manner irrespective of whether the call concerned is an external call, an internal call or a conference call. A group selector incorporated in the local telephone exchange is influenced by program logic located behind the information barrier, without the call handlers being aware of the existence of the group selector.

11 Claims, 5 Drawing Sheets

STORED PROGRAM CONTROLLED DIGITAL PUBLIC EXCHANGE

This application is a continuation of application Ser. No. 08/090,176, filed Jul. 19, 1993, now abandoned.

TECHNICAL FIELD

The present invention relates to a stored-program-controlled local telephone exchange.

BACKGROUND ART

In principle, a stored-program-controlled telephone exchange includes four part-systems, namely a first part-system comprising a plurality of line circuits to which incoming subscriber lines are connected and which further include program logic for monitoring and controlling the connected line circuits. Each subscriber who subscribes to the local exchange is assigned a line circuit. The second part-system includes a plurality of exchange terminals to which external transmission lines to other telephone exchanges are connected. The channels on the transmission lines are grouped in routes with a common point of origin and a common destination. The third part-system includes a switching device, normally a group selector, partly for connecting physically together two lines included in the first part-system, an internal connection, and partly for physically connecting a line in the second part system with a line in the first part-system, a terminating connection, and partly for connecting physically one line from the first part-system with a line from the second part-system, an originating connection. Thus, an internal connection means that a path is established between two internal subscribers of the local exchange. An originating connection means that an internal subscriber of the local exchange is connected to a subscriber who belongs to a different telephone exchange, whereas a terminating connection means that an external subscriber is connected to an exchange internal subscriber.

The fourth part-system of the telephone exchange includes solely program logic which functions to coordinate computer control of the three part-systems. Data records are found in different memory areas and store addressers or identifiers by means of which the program logic is able to identify and control trunk circuits and switching devices. Data records containing address information for, e.g., incoming exchange terminals are linked to data records for outgoing exchange terminals with the aid of separate addressers or identifiers, called pointers. These pointers are used by the program logic in a known manner to identify exchange terminals and switching elements which need to coact when establishing a connection path between two line circuits or between a line circuit and an incoming or an outgoing exchange terminal.

Hardware is linked to data records in the same manner as different data records in different memory areas are linked with pointers. The program logic is thus able to identify and therewith control the hardware linked to a particular data record.

In the case of an originating connection, a data record stored in the first part-system and corresponding to a line circuit is linked to a data record stored in the second part-system and corresponding to an outgoing exchange terminal via a coordinated data record of a first type in the fourth part-system. In the case of a terminating connection, on the other hand, a data post stored in the second system and corresponding to an incoming exchange terminal is linked to a data record stored in the first part-system and corresponding to an outgoing line circuit, this linking also being achieved via a coordinating data record of the first type in the fourth part system. These coordinating data records are normally referred to as call handlers. These call handlers are seized dynamically when dialing, or key sending, a telephone number and contain a large amount of information, among other things information relating to the telephone numbers of the parties concerned with the call, the category, route, multiple group selector states, etc.

If a subscriber wishes to be connected to a conference telephone system, i.e. a system which enables several parties to converse with one another simultaneously, new connection cases arise, e.g. in the three-party case, namely standard three-party with all three exchange subscribers internal;

standard three-party with two of the subscribers being internal and a third external, the connection path thus including an exchange terminal;

standard three-party with one internal subscriber and two external subscribers, the connection path therewith including two exchange terminals.

DISCLOSURE OF THE INVENTION

All connection variants are controlled by a main central call handler provided with an associated program. The software that needs to be produced in order for the call handler to be able to handle connections of the aforesaid type and also conference telephone systems becomes highly complicated and difficult to comprehend and design, since the program must be capable of dealing with all conceivable connection situations.

The problem becomes still more complicated and the number of connection variants increases dramatically in those cases when the subscribers subscribe to flash services, e.g. enquiries, inquiry reciprocation, operator intrusion, call waiting etc. The use of a centralized call handler which, under the control of a program, has the supervisory control over all connection variants becomes confusing or unpredictable, particularly when the flash services are also used during an ongoing conference call or conversation. Finally, interference occurs between the different subscriber functions.

The object of the present invention is to avoid the use of a central call handler and to reduce the number of connection variants.

Another object of the invention is to reduce the number of connection variants to essentially two basic forms, namely an originating connection and a terminating connection respectively, and combinations thereof. In this way, an internal connection will be considered a combination of an originating connection plus a terminating connection. A third basic form is a tandem or transit connection, i.e. a connection between two exchange terminals in the second part-system.

One method of achieving this is to connect an outgoing exchange terminal (ET) to an incoming exchange terminal. The structure is then:

$$A\text{-LI}\rightarrow ET\rightarrow ET\rightarrow LI\text{-B}$$

where A signifies the calling subscriber; B signifies the called subscriber; LI signify the line circuit of respective subscribers; and ET signifies an outgoing and an incoming exchange terminal respectively.

An internal connection is thus split into two halves. The A-half, A-LI→ET, is a normal originating connection and the B-half, ET→LI-B, is a normal terminating connection. Each connection half has a respective call handler. This means that the program logic need only be capable of handling the two basic types of connection, i.e. originating and terminating connections.

The invention also relates to a stored-program-controlled local exchange in which conference equipment can be connected directly to an existing exchange terminal, this equipment either being incorporated in the local exchange or being remote from the exchange and located in some other place. This results in a decrease in the number of connection variants which the program control needs to keep track of. In the case of the exchange internal subscriber, services which function without problem in conjunction with external calls will function in the same manner with conference calls, since this connection case is converted to an "external call". The A-subscriber is able to activate these services in precisely the same manner as with normal external calls. The connection case conference-connection no longer exists.

SUMMARY OF THE INVENTION

The aforesaid objects are achieved with an arrangement having the characteristic features set forth below. According to one embodiment of the invention, the inventive stored-program-controlled local telephone exchange is supplemented with two digital trunk terminals and a physical wire connection there-between. All internal connections are directed over these two trunk terminals, which can be understood as representing an additional route, i.e. a connection path which has a separate route.

According to one preferred embodiment, the aforesaid additional route is realized by a virtual exchange terminal produced by linking data records together. This solution has the advantage of being much cheaper than the aforesaid two wire-connected exchange terminals.

Conference equipment is either connected directly to an external exchange terminal or is itself connected as an external exchange terminal.

BRIEF DESCRIPTION OF THE DRAWINGS

An arrangement according to the invention will now be described in more detail with the aid of an exemplifying embodiment thereof and with reference to the accompanying drawings, in which.

BEST MODE OF CARRYING OUT THE INVENTION

Figure 1:
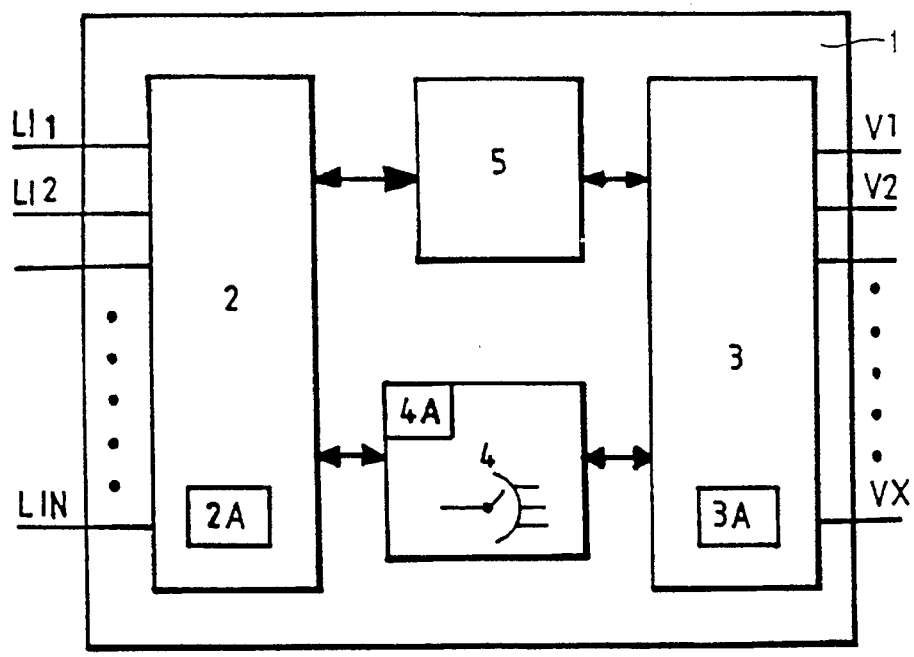
FIG. 1 is a block schematic of the functional units in a digital local telephone exchange.

FIG. 1 illustrates a stored-program-controlled local exchange 1 which includes a plurality of incoming subscribers lines LI1, LI2 . . . LIN connected to a first part-system 2. Departing from the local exchange are a number of routes or connection lines V1, V2 . . . VX. These routes depart from a second part system 3 in the exchange. The exchange includes a third part-system 4 which functions to establish a connection path between a subscriber line and a route, or to establish a connection path between two connection lines. Each of the part system 2, 3 and 4 comprise program and data memory areas 2A, 3A and 4A, respectively.

Finally, the local exchange includes a fourth part-system 5 which includes solely program logic for coordinating computer control of the three part-systems.

Figure 2:
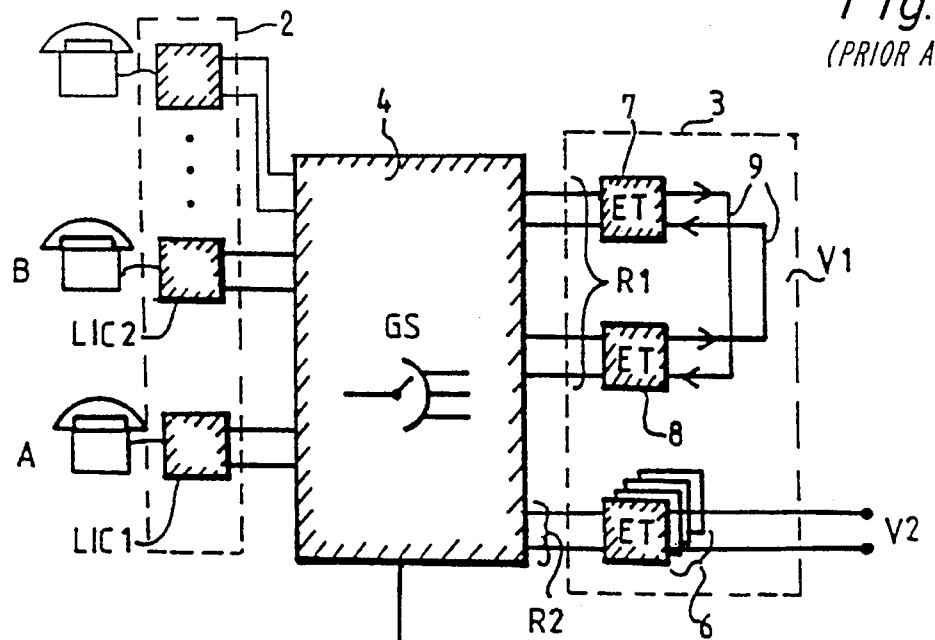
FIG. 2 is a block schematic of a first embodiment of a local telephone exchange provided with an exchange terminal for handling internal telephone calls, said exchange terminal being realized with hardware.

FIG. 2 illustrates a first exemplifying embodiment of the inventive local exchange 1. The first part-system includes a number of line circuits LIC1, LIC2 . . . LICN, each of which is connected to a respective subscriber. The second part-system 3 includes a number of digital trunk terminals, also referred to as exchange terminal ETS shown schematically at reference numeral 6. Each trunk terminal includes, for instance, 30 channels and several trunk terminal may be bound to a common route, for instance the route V2 in FIG. 2. According to the invention, two occurrent trunk terminal 7 and 8 are mutually connected by means of a physical wire connection 9. The two trunk terminal 7, 8, which are connected back-to-back, can be said to represent a route, reference V1, which leads back to the local exchange. The inputs to the digital trunk terminal 7, 8 can be said to represent the route or connection path which a call shall follow. This route is designated schematically route R1 in FIG. 2. Similarly, the inputs to the digital trunk terminal 6 form another connection path or route, reference R2, to the route V2. Occurrent digital trunk terminal (not shown) are included in the local exchange and are connected to other routes and have other routes.

The hardware in the first, second and third part-systems 2, 3 and 4 respectively are controlled by a central processor unit 10A and a program and data memory 10B.

The fourth part-system, however, includes only program and data memory areas.

The central processor unit 10A makes, inter alia, under the control of the fourth part-system 5, an analysis of the number dialed by a subscriber on his telephone apparatus when making an internal and originating telephone call, and also analyzes those digits that are transmitted to the local exchange from another telephone exchange over, for instance, the route V2 and a trunk terminal 6 during an external, terminating telephone call. Depending on the result of this number analysis, the fourth part-system establishes an appropriate connection path through the switching device in the third part system. This switching device is normally a group selector GS. Assume that subscriber A calls up subscriber B. The program and data memory will find from the number analysis that the number of the B-Subscriber subscribes to the local exchange and that route R1 shall thus be selected. Assume now that subscriber A wishes to call a subscriber who does not belong to the telephone exchange 1. The number analysis will then show that another connection path shall be established and that this path shall follow, for instance, route R2. If, on the other hand, subscriber A is called from a subscriber who belongs to another telephone exchange, it is not necessary, in principle, for the number analysis to result in a selection of route, but merely in a selection of an unoccupied connection path to the A-subscriber through the switching device in the third part-system. The connecting path through the group selector is determined, among other things, by the multiple states of the subscribers, here referenced GS-INLET, in the group selector GS. The manner in which a connection path is established will not be described in detail here, since this is well known to those skilled in this art.

The program and data memory areas 5 of the fourth part-system include a number of data records, call handlers, which are seized dynamically when dialing a number and establishing a connection path. These call handlers can, in simple terms, be described as a record card which forms part of a card register and which includes information concerning the number of the subscriber called, the line circuit and unoccupied exchange terminal. The call handlers also include such information as subscriber category, length of call measurement, call charge data and other information which will not be described in detail here since this information is not concerned with the present invention.

Thus, when establishing an originating connection, a call handler is seized and the handler, among other things, initiates a search for an unoccupied exchange terminal. If the call handler finds an unoccupied exchange terminal, the handler reserves or seizes the exchange terminal for its own use. In the case of a terminating connection, there is also seized a call handler which is different to the first mentioned and which, among other things, includes information concerning the identity of the incoming exchange terminal and, after a while, also concerning the aforesaid multiple states in the group selector which lead to the called subscriber. Thus, in the case of an originating connection an exchange terminal 6 functions as an out-going exchange terminal for the call handler, whereas in the case of a terminating connection, a used exchange terminal 6 behaves as an incoming exchange terminal for the call handler.

If subscriber A calls up subscriber B and the number analysis shows that route R1 shall be selected, the data and program memory 5 will look for an unoccupied exchange terminal which belongs to route R1 and finds, for example, the exchange terminal 7. The call handler which is then set-up will regard the exchange terminal as an outgoing exchange terminal which is commanded, in a known manner, to send line and register signals which, via the physical wire connection 9, are led to the exchange terminal 8 which is therewith seized and in turn look for an unoccupied call handler and seizes the same. The thus seized call handler will now be regarded by the exchange terminal 8 as an incoming exchange terminal. In this way, an internal connection will be split into two connection halves, the one half corresponding to the connection for an originating connection and the other corresponding to the connection for a terminating connection. Thus, an internal connection will be considered as being the sum of a terminating and an originating connection. The effect achieved hereby is that the software which sets-up the call handlers need only create two types of handler, namely a handler for originating connections and a handler for terminating connections. These two types of handler are also constructed in principly the same manner, as will be evident from the following. The addition of the two exchange terminals 7 and 8 simplifies the program controlled call handling. No such exchange terminals are found in a conventional telephone exchange, and instead, as before mentioned, the connection path through the group selector is established internally in the group selector on the basis of the aforesaid route and number analysis.

One drawback with the embodiment just described is that the additional exchange terminals 7 and 8 are expensive. Furthermore, the exchange terminals can be used solely for internal telephone calls and not for originating or terminating connections. Consequently, this embodiment will primarily be concerned with local exchanges in which very few internal connections are established. As before mentioned, an exchange terminal has, e.g., 30 channels. Consequently, two exchange terminals which are coupled back-to-back can handle only 30 calls. This embodiment of the invention thus finds suitable use in mobile telephone stations.

In the case of a stored-program-controlled local exchange which includes a central processor with program and data memories, it is now possible, in accordance with the invention, to simulate, even called emulate, two exchange terminals coupled back-to-back. This saves the cost of two exchange terminals of hardware construction. This is achieved solely at the cost of those memory areas that are occupied by a pair of such emulated back-to-back exchange terminals in the available memory space. Only terminals of this nature are used in embodiments of the invention described in the following, these terminal being referred to hereinafter as a virtual exchange terminal.

Figure 3:
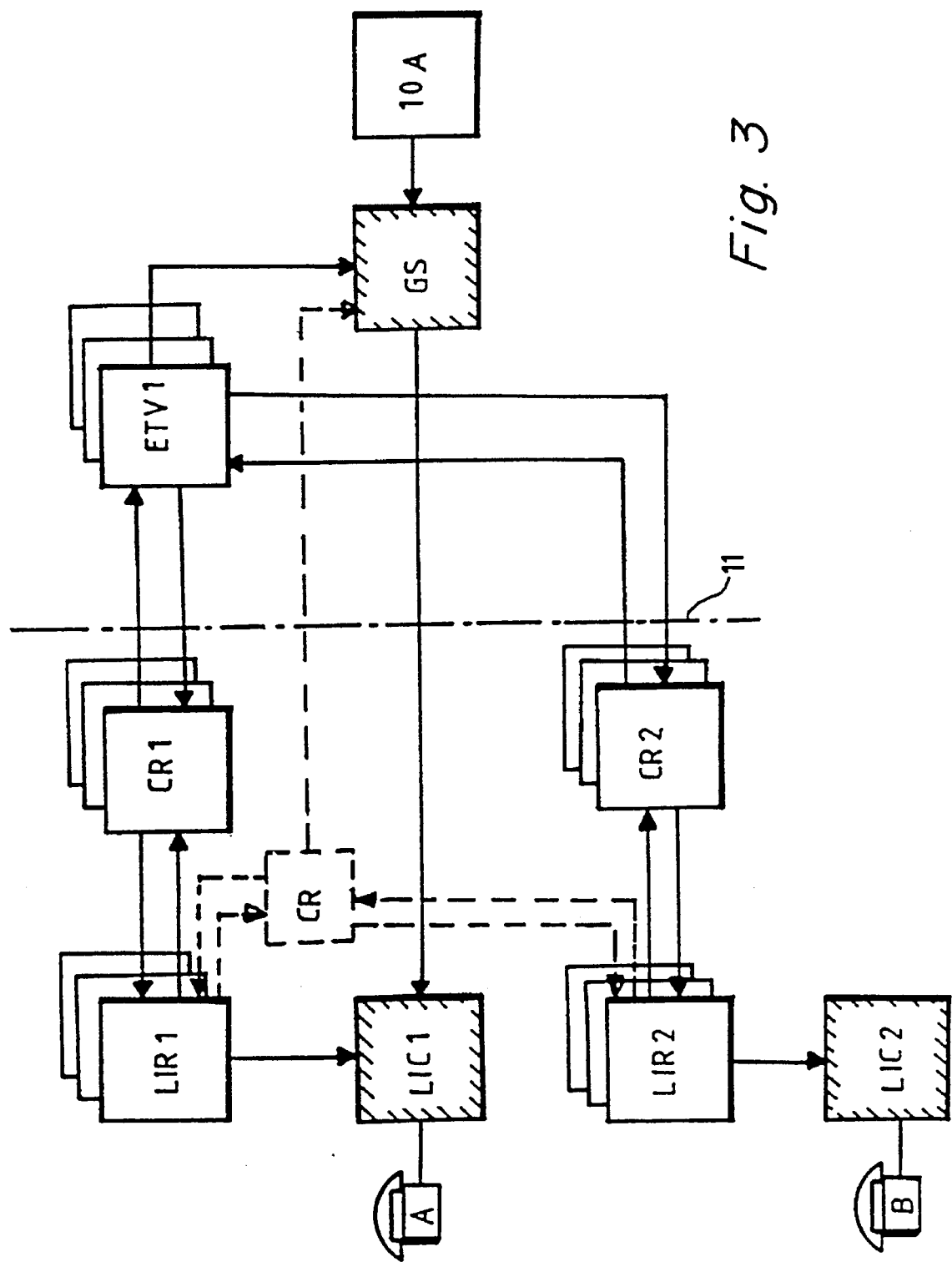
FIG. 3 is a block schematic of those functional units which coact when establishing an internal connection with the aid of the inventive principles and with the use of a virtual exchange terminal.

FIG. 3 illustrates the manner in which different function blocks, i.e. program logic and associated data areas, in the local exchange coact mutually when an internal connection is established, where subscriber A calls up subscriber B. The partially hatched rectangles in FIG. 3 represent hardware, whereas the empty rectangles represent software. LIR1 and LIR2 identify line handlers, CR1 and CR2 identify call handlers, ETV1 identifies a virtual exchange terminal, LIC1 and LIC2 identify line circuits and GS identifies a group selector included in the third part-system. When subscriber A lifts his telephone receiver, or handset, this act is detected in the line circuit LIC1 of the subscriber and a line handler LIR1 is seized. The line handler asks for an unoccupied call handler, in this case CR1, which acknowledges the request and stores information concerning, among other things, the identity of the line handler and the multiple states, GS-INLET-1, of subscriber A in the group selector GS. Upon completion of an analysis of the number dialed by subscriber A on his telephone, a route is selected, which in this case is route 1 since the call concerned is an internal connection, and the call handler CR1 asks for an unoccupied, virtual exchange terminal, in this case ETV1. The request is acknowledged by storing the identity of ETV1 in CR1. GS-INLET-1 is also transmitted to ETV1. ETV1 thus functions as an outgoing exchange terminal. When ETV1 is seized, it will look for an unoccupied call handler, referenced CR2. In relation to CR2, ETV1 will now behave as an incoming exchange terminal. The number of the B-subscriber is sent to CR2 from ETV1, and CR2 looks for an unoccupied line handler for subscriber B. In the present case, the line handler LIR2 is found. LIR2 checks whether or not subscriber B is unengaged and, if such is the case, transmits this information back to CR2, together with the multiple state GS-INLET-2 of subscriber B in the group selector. GS. Among other things, CR2 transmits the information GS-INLET-2 back to ETV1 and when subscriber B lifts his telephone receiver, the connection is established through the group selector GS on the basis of the information stored in ETV1 relating to the multiple positions GS-INLET-1 and GS-INLET-2 of subscribers A and B in the group selector. The call can now commence. When either of the parties concerned replaces his telephone receiver, the connection through the group selector GS and the seized line and call handler is broken, optionally after a given time delay, and the virtual exchange terminal indicates that it is now free. It is evident that two separate connections are established, CR1 for the originating connection half and CR2 for the terminating connection half.

This differs from known techniques, in which no exchange terminal is involved in an internal connection but that, instead, the number analysis reveals that the call concerns an internal connection, wherewith a call handler common to both subscribers, shown in broken lines in FIG. 3 and referenced CR, is seized. The group selector receives from this call handler CR information concerning the multiple states of the subscribers.

The essence of the invention lies in the inability of a call handler CR1 or CR2 to discern the difference between internal and external calls. This can also find expression in the occurrence of an information barrier, indicated by the broken line 11 in FIG. 3. Behind this information barrier is found program logic and associated data. Signalling through the barrier 11, i.e. the transfer of data across the barrier, is effected in an identical manner from the aspect of call handler CR1 or CR2, irrespective of the type of call concerned, i.e. irrespective of whether the call to be handled is an internal call, an external call or a conference call. A further characteristic feature of the invention is that the group selector GS is activated without the call handler having knowledge of the existence of the group selector. The group selector is thus controlled by the program logic behind the information barrier 11 and, when seen from the aspect of the call handlers CR1 and CR2, is located behind this barrier.

Figure 4:
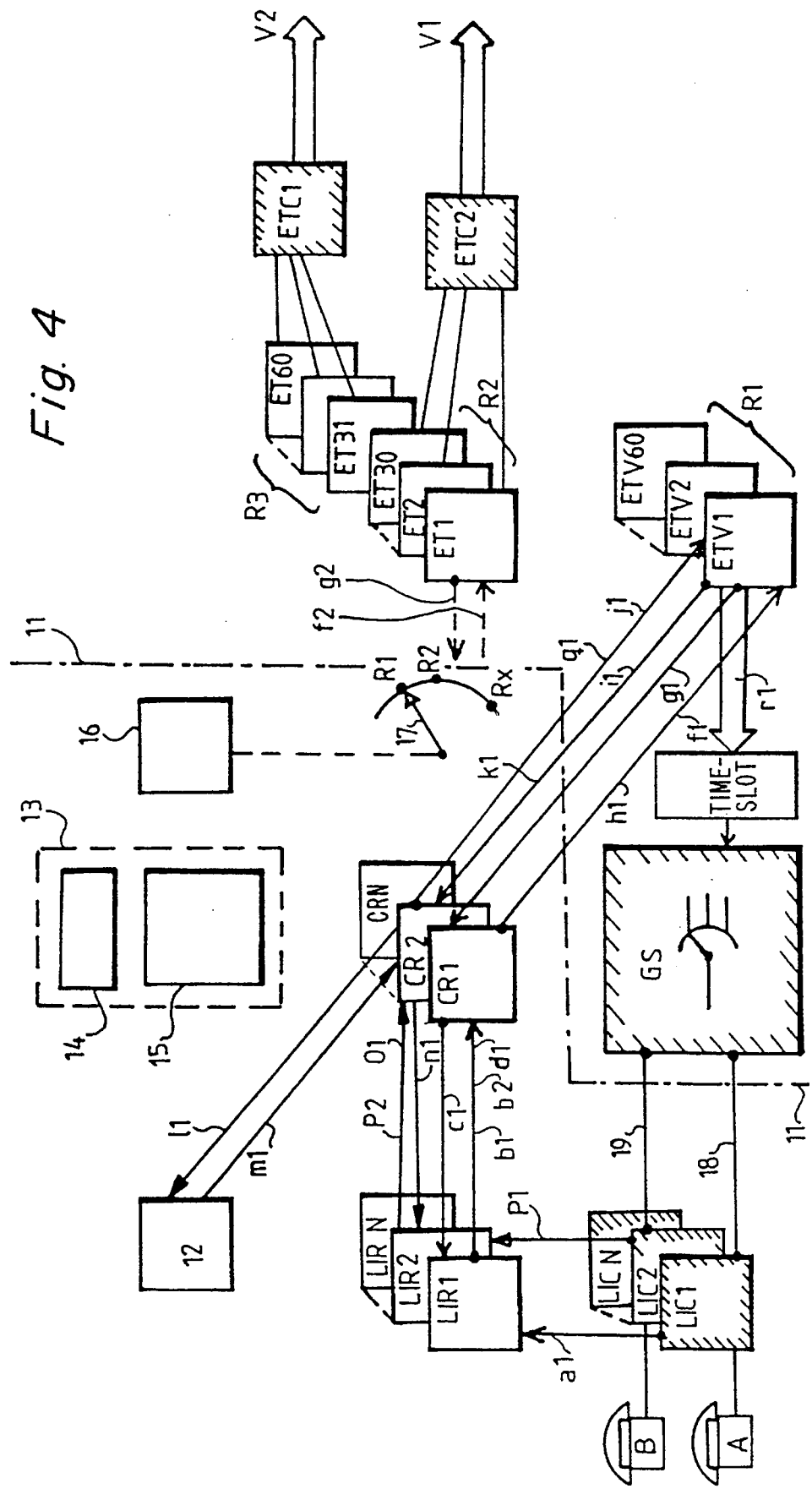
FIG. 4 illustrates schematically different function blocks in the local exchange and also shows how these blocks coact when establishing an external, an internal and an originating connection respectively.

The manner in which different records are linked together in accordance with the invention when establishing different types of connection, will be described in more detail herebelow with reference to FIG. 4. FIG. 4 shows that a respective subscriber line handler LIR1 . . . LIRN corresponds to each line circuit LIC1 . . . LICN. The subscriber line handlers coact with a subscriber data handler 12 in the form of a subscriber register comprising tables stored in the program and memory area 2A oil the local exchange. The local exchange also includes a number of call handlers CR1 . . . CRn which are stored in the program and memory areas 5. These call handlers coact with a register data handler 13 which contains tables of telephone numbers and telephone number routes. The register data handler 13 is also stored in the program and memory areas 5. When requested by a call handler, an analysis is made in the register data handler 13 of the number of the B-subscriber. The result of this analysis is stored in a route handler 14 and an analysis handler 15. Also provided is a route selecting circuit 16. This circuit 16 has a function which is illustrated symbolically by switch 17 which can take a number of different positions, each corresponding to a respective route R1, R2 . . . Rx. A number of software-implemented virtual exchange terminals, referred to below as exchange terminal handlers referenced ETV1, ETV2 . . . ETV60 are stored in the memory 3A. These exchange terminal handlers belong to route R1. A number of software-implemented exchange terminal handlers ET1, ET2 . . . ET60 are also disposed in a memory area of the data memory 3A. Also shown in FIG. 4 are two hardware-implemented digital trunk terminal, ETC1 and ETC2. Each such digital trunk terminal normally has 30 channels, i.e. it is capable of transmitting 30 telephone calls simultaneously. Each of these channels coacts with a corresponding respective exchange terminal handler ET. The exchange terminal handlers ET1 . . . ET30 belong to the digital hardware-implemented trunk terminal ETC1 whereas the exchange change terminal handlers ET31 . . . ET60 belong to the digital hardware-implemented trunk terminal ETC2. The two trunk terminal lead to routes V1 and V2 via transmission units (not shown), of which routes V1 is assumed to lead to a large city and V2 to a different area or locality, for example. The exchange terminal handlers ETV1-ETV60 have no connection with a hardware-implemented digital trunk terminal. The rectangle TIME-SLOT is a data record in the memory 4A which symbolizes an established path through the group selector GS. The physical connection of LIC1 and LIC2 is shown by the lines 18 and 19, which thus represent the path established.

The establishment of connections and the linking of data records in the various handlers will now be described in more detail for each of the three connection cases internal connections, outgoing connections and incoming connections.

Internal Connections:

The A-subscriber calls up the B-subscriber.

a) LIC1 detects that the A-subscriber has lifted his telephone receiver. This is indicated by the arrow a1.

b) The line handler LIR1 detects that the A-subscriber has lifted the receiver of his telephone apparatus. The line handler then asks for an unoccupied call handler and finds the call handler CR1. LIR1 transmits information LIC-POINT concerning the line circuit individual (LIC1) concerned. This is identified by the arrow b1. LIC1 also transmits information (GS-INLET-1) concerning the line circuit-individual-input in the group selector, which is shown by the arrow b2, which for the sake of clarity is drawn coincidental with the arrow b1 in FIG. 4.

c) The call handler CR1 acknowledges the seizure request from LIR1 and tranmits information, CR-POINT, concerning the call handler individual selected. This is indicated by the arrow c1. The call handler CR1 then initiates transmission of a dialing tone to the A-subscriber.

d) The A-subscriber now sends the B-subscriber digits to the line circuit (or to a code receiver if such a receiver is included). The digits are transmitted by LIR1 to the call handler CR1, indicated by the arrow d1 which is coincidental with the arrow b1, and the call handler orders an analysis to be made of the B-number.

e) The digits of the B-number are analyzed in the register data tables 13, digit-by-digit in the same order as the digits arrive. The analysis result is presented in the form of a route selection. This route is route R1 in the present case.

In the case of a conventional telephone exchange, the result of the number analysis would indicate an internal call. As a result, the call handler CR1 would ask the subscriber register 12 the identity of the line handler connected to the B-number. According to the present invention, the call handler CR1 instead searches for an unoccupied exchange terminal handler for the route given, i.e. the route R1 in the present case, in precisely the same manner as though the call concerned was an outgoing call, i.e. as though the call was an originating connection.

f) The call handler CR1 thus requests for an unoccupied exchange terminal handler. This is indicated with the arrow f1. At the same time as this request is transmitted, information is also transmitted to the exchange terminal handler ETV1 concerning the identity of the call handler, CR-PO-INT, and the group selector input, GS-INLET-1, of the line circuit LIC1.

g) ETV1 acknowledges with its identity, reference ET-POINT, indicated at arrow g1.

h) The call handler CR1 begins to send the B-number to the seized exchange terminal handler ETV1. This is shown symbolically by the arrow h1, which coincides with the arrow f1 in the drawing.

i) The exchange terminal handler ETV1 now asks for a new call handler. This request is represented by the arrow i1. The exchange terminal handler finds the unoccupied call handler CR2.

j) This new call handler CR2 acknowledges with its identity, CH-POINT-2, which is sent to ETV1. This is indicated with the arrow j1.

k) The exchange terminal handler ETV1 now begins to send the B-number to the call handler CR2. This is represented by the arrow k1 which coincides with arrow i1 on the drawing.

l) The call handler CR2 sends the B-number to the register tables 13 for analysis and learns that the number is a normal, internal B-number.

CR2 then sends the B-number to the subscriber data handler 12. This is indicated by the arrow 11.

m) The subscriber data handler 12 acknowledges with the identity, LIC-POINT, on the line handler LIR2 of the B-subscriber. This acknowledgement is represented by the arrow ml.

n) The call handler CR2 now asks the subscriber line handler LIR2 whether the line stated is free or not. This is indicated by the arrow n1.

o) LIR2 initiates ringing and sends a ringing tone to the B-subscriber, if the B-subscriber telephone is unoccupied, and acknowledges CR2's inquiry by sending the input of the B-subscriber to the group selector, GS-INLET-2 to CR2. This acknowledgement is indicated by the arrow o1.

p) The B-subscriber lifts his telephone receiver, indicated by arrow p1, and LIR1 informs CR2 that this has taken place, indicated by the arrow p2.

q) CR2 now sends information GS-INLET-2 to ETV1 and informs ETV1 that the B-subscriber has lifted his telephone receiver. This information transfer is represented by the arrow q1, which coincides with the arrow J1 in the drawing.

r) ETV1 now orders the establishment of the path in the group selector. This command is represented by the arrow r1.

s) LIR1 and LIR2 now both wait for the telephone receiver to be replaced.

t) Either the A-subscriber or the B-subscriber replaces his telephone receiver.

u) If the B-subscriber is the first to replace his telephone receiver, CR2 is informed.

v) CR2 now waits for subscriber A to replace his telephone receiver if a double release is required. If a double release is not required, CR2 orders a calling-subscriber release.

w) CR2 sends a release signal to both LIR2 and ETV1.

x) ETV1 sends a release signal to CR1 and marks itself idle at the same time as it orders disconnection of the path established through the group selector.

y) CR1 marks itself idle and sends a release signal to LIR1.

z) LIR1 marks itself idle.

aa) The connection is now terminated.

It will be noted that although the exchange terminal handler ETV1 lacks hardware, it behaves to the call handler CR1 of an outgoing call as though it had hardware. It will also be noted that although the exchange terminal handler ETV1 lacks hardware, it behaves towards the call handler CR2 for incoming calls as though the exchange terminal handler ETV1 had received an incoming call from a digital trunk terminal.

External Connection:

If the call concerned is an outgoing call, i.e. an originating connection, the steps a–e above are carried out and in step f CR1 will ask for an unoccupied exchange terminal handler belonging to the route given by the analysis result. Assume that the call shall go out on route V1 and that CR1 finds an unoccupied exchange terminal handler ET1. This request for an unoccupied exchange terminal handler is indicated in FIG. 4 with the broken line arrow f2, the foot of which thus sits in CR1, although this is not shown for reasons of clarity. CR1 sends its identity CR-POINT and the input GS-INLET-1 of LIC1 to ET1. In the next step g, ET1 acknowledges with its identity, ET-POINT, this identity being represented by the broken line arrow g2. In the next step h, CR1 sends the B-number to ET1. A path shall now be established through the group selector and contact established with coacting exchange terminal handlers in the receiver station, the B-number digits shall be transmitted, etc. All this is well known and will not therefore be described in detail.

Terminating Connection:

If the call concerned is still an external call but this time an incoming call, i.e. a terminating connection, the exchange terminal handler ET which corresponds to the channel on which the call arrives will request for an unoccupied call handler CR and the steps j–o will be carried out. This connection set-up is also well known to the person skilled in this art and will not therefore be described in detail.

Figure 5:
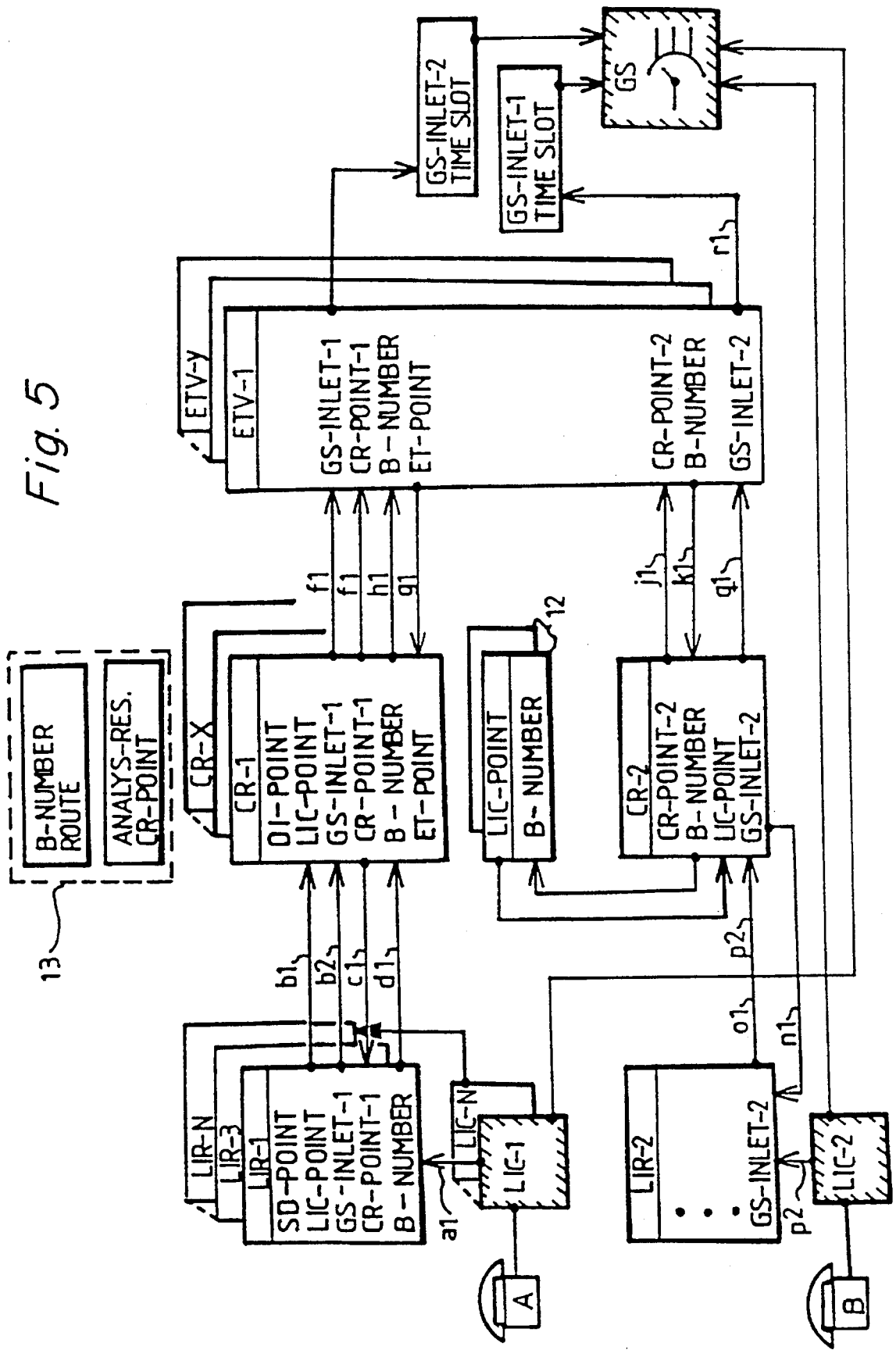
FIG. 5 illustrates in detail the different data records which are mutually linked in the exchange shown in FIG. 4.

FIG. 5 illustrates how the data records in the various memory area is of the data memory are mutually linked with the aid of pointers corresponding to the arrows a1–q1 in FIG. 4. The use of such pointers is well known in data technique and implies a type of indirect address. The pointer includes the address to the site in which the information is stored. Such indirect addressing can be performed in many different ways known to the skilled person and will not therefore be described in detail, since such use forms no part of the present invention. According to the invention, it is where the pointer points that is of interest and not the use of a pointer. FIG. 5 illustrates the manner in which the various handlers coact to transmit information to ETV1 Concerning the states of the line circuits in the group selector. ETV1 then uses this information to establish the connection through the group selector. Mutually corresponding arrows in FIGS. 4 and 5 are identified by the same reference signs. The data records SD-point and DI-point in LIR1 and CR1 respectively denote the table positions in the subscriber data handler 12 and in the register data tables 13 respectively. The data record TIME-SLOT symbolizes the path established in the group selector GS, in a manner well known to the skilled person. GS-INLET-1 functions as a pointer and points to a data record in which GS-INLET-2 is stored.

Figure 6:
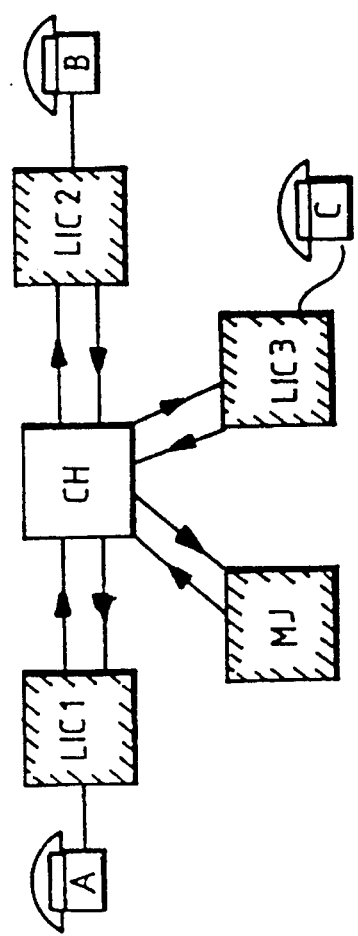
FIG. 6 illustrates a call handler according to the present standpoint of techniques in conjunction with the use of conference equipment.

Conference Connection:

Shown in FIG. 6 is a call handler CH in a conventional telephone exchange. The handler CH is common to the conference equipment MJ and the three subscribers A, B and C which participate mutually in a telephone conference. One or two of the subscribers may be the local exchange external subscribers and any one of the subscribers A, B, C shall be able to request flash-services, i.e. inquiry services (for example when a person calls a telephone company and asks for the directory number of a person or business), inquiry reciprocation, during an on going conference call. The following example will explain what happens if the A-subscriber has initiated a conference, i.e. A-LIC is connected to the conference equipment MJ which, in turn, is connected to the B and C subscribers.

If either B or C is the local exchange external subscriber and requests a flash service, no problems will occur in their respective telephone exchanges. The local exchange of B or C subscriber is not aware that respective subscribers participate in a telephone conference, but treat each connection as a terminating connection (it is understood that A is the calling subscriber, as is known to the skilled person in this field) and the situation is problem-free. The call handler generated is not aware that it is involved in a conference.

On the other hand, a different situation arises when the A-subscriber asks for a flash service. It is impossible, in this case, to avoid an increase in the number of connection cases when connection handling is centralized in this way. It will be understood that the software which is intended to control the set-up of such central, common call handlers will become complicated if it is necessary to take in to account all of the conceivable connection cases that can occur theoretically.

According to the invention, one solution to the problem is to connect the conference equipment MJ and its hardware exchange terminal ETC to an exchange terminal handler designated ETVMJ, analogously to the standard exchange terminal handlers and the virtual exchange terminal handlers respectively. Thus, there is used the same procedure as that used in the case of an internal connection. If the conference equipment MJ is now connected to its exchange terminal handler, ETVMJ, the following structure is obtained:

A-LI→ET-(hardware implemented exchange terminal)→ MJ-(hardware implemented exchange terminal)-ET→LI-B, when the B-subscriber belongs to the telephone exchange.

Thus, according to the invention, the conference equipment MJ is connected to a standard digital trunk terminal. Signalling to the conference equipment MJ takes place with an increase in the signals which occur at the hardware exchange terminal ET.

Figure 7:
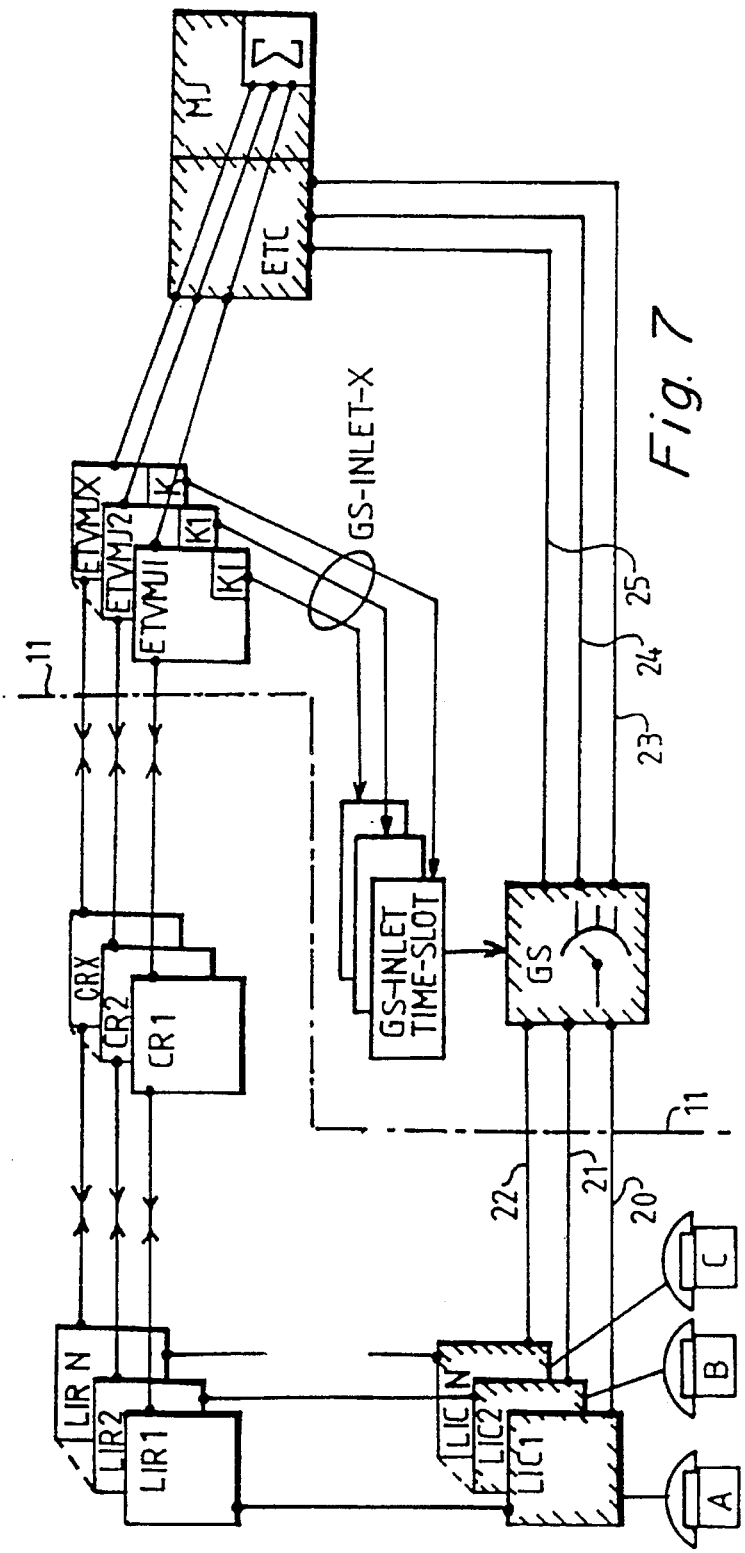
FIG. 7 illustrates how conference equipment connected to an exchange terminal to the local exchange is handled as a number of incoming and outgoing calls by the call handler.

As will be seen from FIG. 7, according to the invention, the conference equipment MJ is now connected to a standard digital trunk terminal ETC. The conference equipment MJ with its channels can be considered to be a digital route with "crosstalk" between the channels. Assume that three parties A, B, C participate in a conference, called conference K1. Each party has a respective channel in the digital trunk terminal and therefore also a respective exchange terminal handler ETVMJ1, ETVNH2, and ETVMJN, and call handler CR1, CR2, CRN. The subscriber A wishes to listen to speech on the A subscriber channel solely from those channels which belong to B and C, since A has no desire to listen to his own voice. This also applies to each of the remaining parties B and C. If one of the parties wishes to use a flash service, a new call handler is set-up to this new end. This flash service will then be understood by the call handler as being an originating or terminating connection, i.e. a normal telephone call. The state of the subscriber in the group selector (GS-INLET-n), the identity (CR-POINT) of the call handler to which the exchange terminal handler is associated and the identity (ET-POINT) of the digital trunk terminal to which the conference equipment is connected are stored in each such exchange terminal handler in the same manner as in the case of an internal connection. In addition, there is stored in each exchange terminal handler information concerning the identity K1 of the conference. In the same manner as that in FIG. 4, the lines 20, 21, 22, 23, 24. 25 in FIG. 7 signify the physical mutual connection of the line circuits of the subscribers A, B and C through the group selector GS, whereas the arrows GS-INLET-X signify pointers to the multiple states GS-INLET of the subscribers A, B and C in the group selector. These multiple states are symbolized by the rectangles GS-INLET/TIME-SLOT.

The advantage gained by introducing such additional occurrent exchange terminal and call handlers is thus that the call handlers need only handle originating and terminating connections and need not keep a check on whether or not one of the parties requests a flash service.

Instead of transmitting the multiple states GS-INLET-1, GS-INLET-2 of the line circuits LIR1, LIR2 of the respective calling and called subscribers in the group selector to an exchange terminal handler ETV1 or ETVMJ-1, it is possible, according to the invention, to transmit to an exchange terminal handler references to the line handler LIR1 and LIR2 of respective subscribers, these references being able to point-out indirectly the same information concerning the position of the light circuit concerned in the group selector. LIR-1 contains, after all, the information GS-INLET-1 and LIR-2 contains the information GS-INLET-2. In this case, call hand, ling is the same as that earlier described, the only difference in FIG. 5 being that the text GS-INLET-1 shall be replaced with LIR-1 and that the text GS-INLET-2 shall be replaced with LIR-2 in the call handlers CR-1 and CR-2 and in the exchange terminal handler ETV-1.

As an alternative to transmitting GS-INLET to ETV, tables in the group selector GS may disclose the relationship between the line handlers LIR and the state GS-INLET in the group selector.

I claim:

1. An arrangement for completing calls in a stored program controlled digital local telephone exchange, comprising:

means for splitting an internal exchange call into two call halves, an originating call half and a terminating call half;

a plurality of call handlers, wherein each call half is associated with a respective call handler that comprises software for handling an originating connection and a terminating connection; and a plurality of exchange terminal means for connecting said call halves to each other.

2. An arrangement in accordance with claim 1, wherein said exchange terminal means comprises a virtual trunk, each one of said exchange terminal means being linked to a respective line circuit handler, each one of said line circuit handlers being associated with a respective hardware implemented line circuit.

3. An arrangement in accordance with claim 2, wherein said virtual trunk transfers a data record.

4. An arrangement in accordance with claim 2, wherein said virtual trunk comprises program logic for establishing a connection using a group selector of said local telephone exchange, said connection extending between two internal exchange subscribers.

5. An arrangement in accordance with claim 4, wherein said software of said call handler associated with said originating connection operates to initiate analyses of a number dialed in order to find a route leading to the terminating connection of said call, said route being said virtual trunk.

6. An arrangement for completing calls in a stored program controlled digital local telephone exchange, comprising:

means for splitting an internal exchange call into two call halves;

a plurality of call handlers, wherein each call half is associated with a respective call handler, each such call handler having software for handling an originating connection and a terminating connection, one of said two call handlers being associated with an originating call half and another with a terminating call half, wherein an outgoing call from said exchange is treated as an originating call half to which a first one of said call handlers is associated and wherein an incoming call to said exchange is considered as a terminating call half to which a second one of said call handlers is associated, said first call handler being different from said second call handler.

7. An arrangement in accordance with claim 6, wherein said software of said first call handler associated with said originating call halves operates to initiate analyses of a dialed number in order to find a route leading to the terminating connection of said call, said route being a virtual trunk in the case of an internal exchange call and being a hardware implemented exchange terminal in the case of an outgoing call.

8. An arrangement in accordance with claim 7, wherein for an outgoing call from said telephone exchange, the call handler associated with said outgoing call is linked to an exchange terminal handler associated with said hardware implemented exchange terminal, said exchange terminal handler being adapted to establish through a group selector a connection path between a subscriber line circuit and its associated exchange terminal.

9. An arrangement in accordance with claim 8, wherein conference equipment is connected to said hardware implemented exchange terminal, a plurality of virtual exchange terminals being assigned to a separate route, said plurality of virtual exchange terminals functioning as said exchange terminal handler.

10. An arrangement in accordance with claim 9, wherein each party of a conference call has a respective channel in a hardware implemented digital trunk terminal, a respective virtual exchange terminal and a respective call handler, each of said virtual exchange terminals comprising information concerning the identity of the conference.

11. An arrangement in accordance with claim 10, wherein a flash service requested by one of said parties in the conference call is considered by said software in said call handler in the same way as if the party was involved in a normal originating or terminating connection.

* * * * *